Dec. 9, 1952     R. B. HOLT ET AL     2,620,893
FILTER FOR EXHAUST PIPES OF INTERNAL-COMBUSTION ENGINES
Filed April 28, 1949
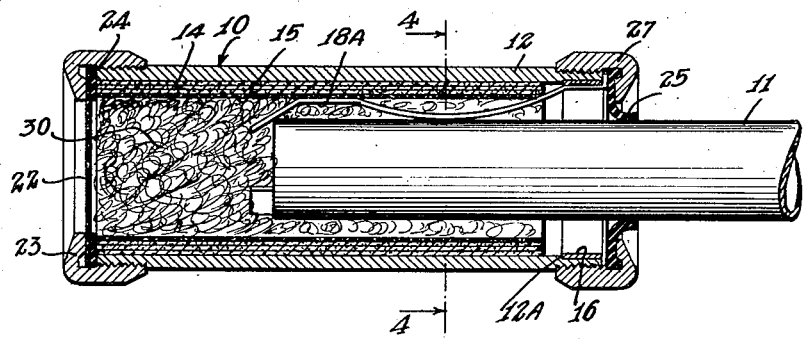
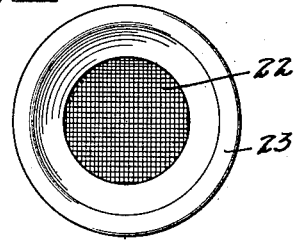
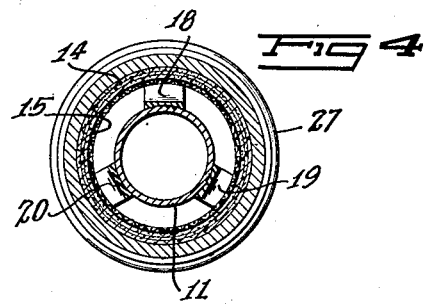
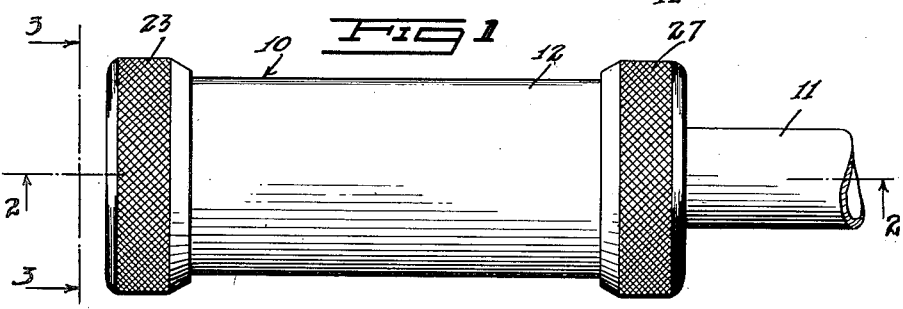
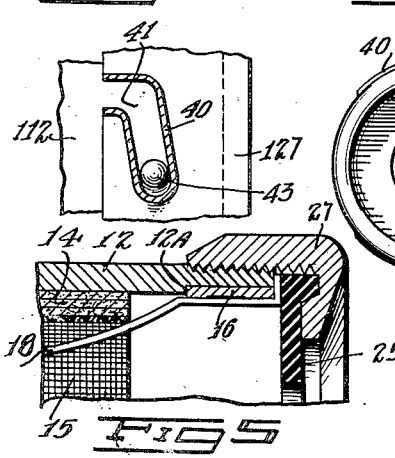
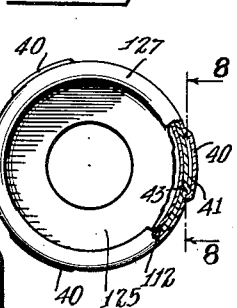
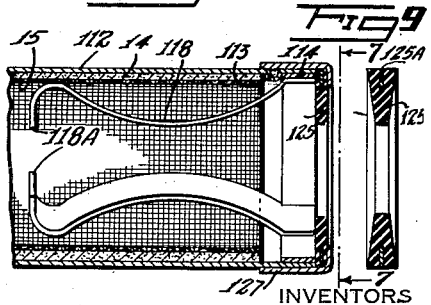
INVENTORS
Raymond B. Holt
Clarence H. Rountree
BY Lyon & Lyon ATTORNEYS.

Patented Dec. 9, 1952

2,620,893

UNITED STATES PATENT OFFICE 2,620,893

FILTER FOR EXHAUST PIPES OF INTERNAL-COMBUSTION ENGINES

Raymond B. Holt and Clarence H. Rountree, Alhambra, Calif.

Application April 28, 1949, Serial No. 90,142

1 Claim. (Cl. 183—45)

The present invention relates to an improved filter quickly attachable and detachable to and from the end of an exhaust pipe of an automobile, and is intended primarily to allow new automobiles to be driven from and to automobile dealers' display rooms without soiling the floor, rugs and the like.

In the display and sale of new automobiles it is desirable to transport the same from and to display rooms under their own power, and even to run or idle such automobiles in the display rooms. This practice of running new automobiles is not generally used since liquid condensates leaving the exhaust pipe drip on the floor, rugs and the like to mar the appearance of the showroom.

It is therefore an important object of the present invention to provide an improved filter especially designed for the above intended purposes.

Another object of the present invention is to provide an improved filter for the above indicated purposes, characterized by its structure allowing it to be readily attached and detached from the ends of exhaust pipes.

Another object of the present invention is to provide an improved filter for the above indicated purposes, characterized by the fact that such filter incorporates an expendable blotter adapted to absorb liquid condensates, the construction of the filter being that such blotter may be readily removed and replaced.

Another object of the present invention is to provide an improved filter of this type, characterized by its simplicity and inexpensive manufacture in accordance with present day mass production methods and processes.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings in which:

Figure 1 is a view in elevation of a filter element embodying the present invention mounted on the protruding end of an exhaust pipe of an automobile, Figure 2 is a sectional view taken substantially on the line 2—2 of Figure 1, Figure 3 is a view in end elevation taken substantially in the direction indicated by the arrows 3—3 in Figure 1, Figure 4 is a sectional view taken substantially on the line 4—4 of Figure 2, Figure 5 shows in enlarged form some of the structure shown in Figure 2, Figure 6 is a sectional view similar to the sectional view shown in Figure 2 of a modified structure, also embodying features of the present invention, Figure 7 is a view in end elevation taken substantially in the direction indicated by the arrows 7—7 in Figure 6 with a portion of the structure shown in cross section.

Figure 8 is a view taken substantially on the line 8—8 of Figure 7, and

Figure 9 shows a cross sectional view through the ring shaped gasket and sealing member utilized in the construction shown in Figure 6.

An important feature of the present filter is the means incorporated therein allowing them to be readily attached and detached to and from the end of an exhaust pipe of an automobile, and the incorporation therein of an expendable blotter adapted to absorb liquid condensates.

The filter, having the general reference numeral 10, is adapted to be mounted on the end of the exhaust pipe 11 of an automobile. Such filter element 10 includes: a cylindrical shell 12 having both of its ends externally threaded and having concentrically mounted therein an expendable blotter 14 and a wire screen 15; also, concentrically mounted within the cylindrical shell 12 is the ring 16 recessed behind an annular shoulder 12A of the shell, such ring 16 having spot welded thereto equally spaced radial distances thereon three cantilever spring elements 18, 19 and 20, with the ends of such spring elements 18, 19, 20 bent radially outwardly as indicated at Figure 2, so as to cooperate with the end of the cylindrical shell 12 to thereby serve as a stop element; the exhaust or left-hand end of the filter 10 in Figure 2 is closed off by a circular wire screen 22, which is retained in place by the internally screw threaded cap 23 which presses such screen 22 into engagement with a ring-shaped gasket 24, which abuts the elements 12, 14 and 15; the right-hand end or inlet end of the filter 10 is sealed by the ring-shaped flexible seal 25, which is deformable by the exhaust pipe end 11, and which is normally maintained in position by the internally threaded cap 27 similar to the cap 23.

It is noted that the cantilever supported leaf spring elements 18, 19, 20 are bowed radially inwardly at the region intermediate its ends to contact the inserted pipe end 11, while the free ends of such springs 18, 19, 20 are formed to provide a flat seat as indicated by the flat seat 18A in Figure 2, to thereby provide a suitable enlarged contact area with the contacted inner screen 15. This portion 18A of the spring is allowed to move in the longitudinal axis of the filter without digging into the circular wire screen 15 or digging into the blotter 14. It is noted also that the springs 18 are adapted to resiliently engage pipe ends of diameters varying in extended range, and such spring elements adjust themselves accordingly since their free ends are allowed to move longitudinally with respect to the filter with their seat portions (18A) sliding along the internally disposed wire screen 15, which serves to protect the blotter 14 against abrasion which otherwise would result.

Further, it is noted that since the annular seal 25 is of rubber, neoprene or the like, its internal circular edge may be flexed relatively large amounts to also accommodate pipes of diameters varying over an extended range.

It is noted that the flexible member 25 serves not only as a seal, but serves also as a means for supporting or mounting the filter unit on the end of the exhaust pipe 11. It is noted further that the bowed leaf springs 18, 19 and 20 serve to automatically center the end of the exhaust pipe within the filter when and as the filter is being mounted in position.

It is noted further that the gasket member 25 is shown in Figure 2 with its inner annular edge curved outwardly from the direction of the housing. It is observed that this annular edge assumes the position shown in Figure 2 in the process of removing the housing from its position on the pipe end 11. Initially, of course, without the pipe end inserted in the housing, the gasket 25 assumes a planar position as exemplified by the gasket 125 in Figure 6. When and as the housing is mounted on the pipe end 11, the inner annular edge of the gasket 25 is curved inwardly of the housing, so that such inner annular edge must first be flexed from its inwardly extending position to its outwardly extending position shown in Figure 2 in the process of removing the housing from the exhaust pipe end. Such flexing of the inner annular edge of the gasket 25, of course, requires a relatively large force, and this force is utilized to maintain not only a seal between the housing and exhaust pipe end 11, but also as a means whereby the housing is attached to said exhaust pipe end 11.

Preferably, the interior space of the filter 10 is filled with steel wool 30 to prevent the direct escape of the exhaust gases into the atmosphere, and also to provide a medium upon which the liquid condensate from the automobile may accumulate and flow onto the blotter 14 wherein such liquid condensate is absorbed.

It is apparent that the caps 23, 27 may be releasably attached to the cylindrical member 12 by conventional means other than the screw threaded means shown herein. For example, such releasable connection between the caps 23, 27, on the one hand, and the tube 12 on the other hand, may take the form of conventional bayonet type of connection.

Another feature of the construction shown in Figure 2 is that the free ends of the cantilever supported leaf springs 18 extend radially downwardly in the filter in the path of movement of the end of the exhaust pipe 11, to serve as a stop member and to thereby produce an indication that the filter 10 is shoved over the end of the exhaust pipe 11 a desirable amount. In other words, when and as the filter element 10 is pushed or shoved over the end of the exhaust pipe 11, the extreme end of such exhaust pipe 11 contacts the downwardly extending portions of the free end of the leaf spring 18 so that a considerable additional force is necessary to shove the filter 10 further; when such additional force is required a warning is thereby given to the person applying the filter that the filter is correctly positioned.

Referring to the modified structure shown in Figures 6–9, the outer metal tubular member 112 may be of sheet stock with a plurality of "dimples" 113 pressed therein to form a stop against which the ring 114, to which the resilient springs 118 are welded, may abut. It is thus not necessary to form an internal shoulder within the tube as illustrated in Figure 2, but the same purpose may be accomplished by impressing "dimples" 113 in the tubular stock 112; also, it is noted that in the construction shown in Figure 6 it is not necessary that the right-hand of the springs 118 be hooked, as in Figure 2, to contact the circular edge of the tube 112.

The cantilever supported spring elements 118 may have the shape shown in Figure 6, as well as the shape shown in Figure 2, the essential difference in the two constructions in Figures 2 and 6 being that the free ends of springs 118 are rounded where they engage the screen 15 instead of being flat as shown in Figure 2. These springs 118 have their free ends 118A extending downwardly sufficiently to serve as stop members for engagement with the pipe end 11 to produce a desirable indication of correct positioning of the filter element as described hereinabove.

In the construction shown in Figure 6, instead of using a screw threaded cap as 23 and 27 in Figure 2, the corresponding cap 127 in Figure 6 may be fastened to the tube 112 through a bayonet type of connection illustrated at 40 in Figures 7 and 8. Such bayonet type of connection is obtained by forming a plurality of equally radially spaced embossed grooves 41 in the cap member 127 within which a corresponding raised portion or "dimple" 43 on the tube 112 may cooperate to effect such connection.

The seal 125 in Figure 6, corresponding to the seal 25 in Figure 2, comprises an elastic ring within which a steel washer 125A is imbedded or molded. This steel washer 125A, when the seal 125 is inserted as shown in Figure 6, is adjacent the ends of the ring 114 and tube 112, and is pressed in the direction of such ends by the cap 127 to thereby squeeze the elastic material of the seal 125 therebetween to thereby prevent leakage of exhaust gases between the cap 127 and the tube 112. Preferably, as shown in Figure 9, the washer 125A has a tapered cross section to assure the formation of a good seal preventing flow of exhaust gases between the inner surface of the cap 127 and the adjacent outer surface of the tube 112. In all other respects the seal 125 functions in the same manner as the seal 25 described above in Figure 2.

It is noted in both arrangements shown in Figures 2 and 6 that the spring members 18, 118 slide with respect to the abutting screen 15 when and as the filter mounted on the exhaust pipe end is mounted on and removed therefrom.

It is noted further that the screen elements 15 and blotter element 14 may be manufactured and supplied as a replaceable cartridge, which cartridge may easily be inserted and removed from the filter by removing the left-hand cap 24 in Figure 2, it being noted that a similar left-hand cap is used in the construction shown in Figure 6.

Preferably, the steel wool 30 is cadmium plated to prevent corrosion and for long life in relation to the life of the cartridge 14, 15. The screening material 15 may simply be of the type used for household window screens and may either be zinc or copper coated.

While the particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

We claim:

A filter of the character described comprising: a tubular element having an inlet opening and an outlet opening, an annular ring recessed within said tubular member, said ring having mounted thereon at circumferentially spaced points a plurality of bowed leaf springs having their free ends provided with a flat portion, annular liquid condensate absorbing means concentrically mounted within said tubular member, a wire screen concentrically mounted within said absorbing means and adapted to be engaged by said flat portions of said leaf springs to protect said absorbing means from abrasion, the outlet end of said tubular element being closed by a wire screen, the inlet opening of said tubular element being partially closed by a resilient ring-shaped gasket member, said leaf springs having their intermediate portions bowed to resiliently contact the end of an exhaust pipe projected into said filter to position said annular absorbing means centrally within and with respect to said pipe end, said ring-shaped gasket member being also adapted to resiliently engage said exhaust pipe end to provide a seal therebetween, and the internal portion of said filter between said concentrically disposed wire screen and said pipe end being filled with steel wool to impede the direct flow of exhaust gases from the pipe end to said outlet end to provide a medium whereby the liquid products of the exhaust gases may condense and flow onto said liquid absorbing means.

RAYMOND B. HOLT.
CLARENCE H. ROUNTREE.

REFERENCES CITED

The following references are of record in the file of this patent:

UNITED STATES PATENTS

| Number | Name | Date |
|---|---|---|
| 367,578 | Babb | Aug. 2, 1887 |
| 728,200 | Butler | May 19, 1903 |
| 737,357 | Crump et al. | Aug. 25, 1903 |
| 761,505 | Knickerbocker | May 31, 1904 |
| 1,465,904 | Herdle | Aug. 21, 1923 |
| 2,077,563 | Henry | Apr. 20, 1937 |
| 2,095,586 | Algard | Oct. 12, 1937 |
| 2,100,051 | Hallner | Nov. 23, 1937 |
| 2,383,235 | Brown | Aug. 21, 1945 |
| 2,407,484 | Ehrhardt | Sept. 10, 1946 |
| 2,509,778 | Moler | May 30, 1950 |
| 2,543,556 | Senne | Feb. 27, 1951 |